(12) United States Patent
Verhoeven

(10) Patent No.: US 11,889,844 B2
(45) Date of Patent: Feb. 6, 2024

(54) TREATMENT OF INSECTS

(71) Applicant: GEA Food Solutions Bakel B.V., En Bakel (NL)

(72) Inventor: Martinus Johannes Wilhelmus Verhoeven, Tilburg (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 270 days.

(21) Appl. No.: 16/640,134

(22) PCT Filed: Oct. 17, 2018

(86) PCT No.: PCT/EP2018/078329
§ 371 (c)(1),
(2) Date: Feb. 19, 2020

(87) PCT Pub. No.: WO2019/081287
PCT Pub. Date: May 2, 2019

(65) Prior Publication Data
US 2020/0404934 A1 Dec. 31, 2020

(30) Foreign Application Priority Data
Oct. 26, 2017 (EP) .................................... 17198475

(51) Int. Cl.
*A23B 4/09* (2006.01)
*A23K 10/20* (2016.01)
(Continued)

(52) U.S. Cl.
CPC ............. *A23B 4/09* (2013.01); *A01M 1/2094* (2013.01); *A01N 1/00* (2013.01); *A23J 1/00* (2013.01);
(Continued)

(58) Field of Classification Search
CPC ..................... A23B 4/06–4/09; A01M 1/2094; A01N 1/00; A23J 1/00; A23K 10/20;
(Continued)

(56) References Cited

U.S. PATENT DOCUMENTS 2,278,466 A * 4/1942 Musher .................... A23L 23/10
426/103
3,255,599 A * 6/1966 Morrison .................. F25D 3/11
62/65
(Continued)

FOREIGN PATENT DOCUMENTS

| AU | 2013204221 A1 | 10/2014 |
|----|---------------|---------|
| CN | 101116472 A | 2/2008 |

(Continued)

OTHER PUBLICATIONS

International Search Report and Written Opinion for International Application PCT/EP2018/078329, dated Nov. 28, 2018.
(Continued)

*Primary Examiner* — Drew E Becker
(74) *Attorney, Agent, or Firm* — The Dobrusin Law Firm P.C.

(57) ABSTRACT

The present invention relates to a method to treat insects in order to produce a human nutrition and/or an animal feed. The treatment involves at reducing and preferably stopping the autolysis of the insects, preferably using a cooling treatment step. The present invention further relates to a line to process insects.

18 Claims, 2 Drawing Sheets

(51) Int. Cl.
| | |
|---|---|
| *A23L 33/17* | (2016.01) |
| *A01M 1/20* | (2006.01) |
| *A01N 1/00* | (2006.01) |
| *A23J 1/00* | (2006.01) |
| *A23L 3/375* | (2006.01) |

(52) U.S. Cl.
CPC .............. *A23K 10/20* (2016.05); *A23L 3/375* (2013.01); *A23L 33/17* (2016.08); *A23V 2002/00* (2013.01)

(58) Field of Classification Search
CPC ................... A23K 10/12; A23L 33/17; A23L 3/36–3/375; A23V 2002/00; A23V 2300/20
See application file for complete search history.

(56) References Cited

U.S. PATENT DOCUMENTS

| | | | | | |
|---|---|---|---|---|---|
| 3,297,454 | A | * | 1/1967 | Webster | F25D 3/11 426/524 |
| 4,403,479 | A | * | 9/1983 | Rasovich | A23L 3/375 62/380 |
| 4,426,398 | A | * | 1/1984 | Kokura | A23K 10/20 426/805 |
| 4,503,077 | A | * | 3/1985 | Horton | A23K 30/20 426/805 |
| 4,539,824 | A | * | 9/1985 | Kuraoka | A01N 1/02 62/380 |
| 4,700,547 | A | * | 10/1987 | Hayashi | A23B 4/08 62/65 |
| 4,744,995 | A | * | 5/1988 | Robinson | A23L 19/09 426/454 |
| 5,027,546 | A | * | 7/1991 | Tallon | E04B 1/72 43/132.1 |
| 5,165,199 | A | | 11/1992 | Tallon | |
| 5,193,350 | A | * | 3/1993 | Tallafus | A01M 17/008 426/524 |
| 5,256,434 | A | * | 10/1993 | Conway | A23B 4/062 426/396 |
| 5,478,584 | A | * | 12/1995 | Donohue | F25D 16/00 62/65 |
| 5,728,417 | A | * | 3/1998 | Horn | A23B 4/068 426/524 |
| 5,878,582 | A | * | 3/1999 | Appolonia | F25D 3/11 62/380 |
| 6,497,106 | B2 | * | 12/2002 | Lang | A23L 3/361 426/524 |
| 7,429,398 | B1 | * | 9/2008 | Sipe | A01K 97/04 426/520 |
| 2006/0064924 | A1 | | 3/2006 | Lee | |
| 2006/0283196 | A1 | * | 12/2006 | Rosenbaum | F25D 3/11 426/442 |
| 2007/0048419 | A1 | * | 3/2007 | Noda | A23B 7/154 426/321 |
| 2010/0139293 | A1 | * | 6/2010 | Maccise Sade | A23B 4/09 62/50.7 |
| 2011/0151088 | A1 | * | 6/2011 | Newman | A23L 3/375 62/52.1 |
| 2012/0148712 | A1 | * | 6/2012 | Guilfoyle | A23L 33/175 426/231 |
| 2014/0069124 | A1 | * | 3/2014 | Chang | A23L 3/361 62/340 |
| 2017/0318855 | A1 | * | 11/2017 | Mott | A23J 1/02 |
| 2018/0000121 | A1 | * | 1/2018 | Armenjon | C08B 37/003 |
| 2018/0016357 | A1 | * | 1/2018 | Berezina | C08L 5/08 |
| 2018/0310591 | A1 | * | 11/2018 | Cadesky | A23J 3/04 |
| 2019/0133150 | A1 | * | 5/2019 | Lee | A23J 3/16 |
| 2021/0212307 | A1 | * | 7/2021 | Aarts | A23J 1/00 |
| 2021/0315234 | A1 | * | 10/2021 | Kirchner | A23K 10/20 |
| 2022/0306547 | A1 | * | 9/2022 | Gillis | C05F 11/00 |
| 2023/0036951 | A1 | * | 2/2023 | Smetana | A23J 1/00 |

FOREIGN PATENT DOCUMENTS

| | | | |
|---|---|---|---|
| DE | 202016002743 U1 | 5/2016 | |
| EP | 0863373 A2 | 9/1998 | |
| EP | 3078277 A1 | 10/2016 | |
| RU | 2052248 C1 | 1/1996 | |
| WO | WO-0064287 A1 * | 11/2000 | .......... A01M 17/008 |
| WO | 2017/007309 A1 | 1/2017 | |

OTHER PUBLICATIONS

International Preliminary Report on Patentability for International Application PCT/EP2018/078329, dated Dec. 20, 2019.

Donald J Cleland et al: "Prediction of Freezing Time and Design of Food Freezers" In: "Handbook of Food Engineering Practice", Jul. 23, 1997 (Jul. 23, 1997); pp. 73-121.

Kiezebrink: "Topinsect (Frozen Insects)",Apr. 25, 2016 (Apr. 25, 2016).

XP-002741199; Database WPI Week 20084; Thomson Scientific, London, GB; AN 2008-G34871, 2008.

Russian Office Action, dated Feb. 7, 2022, for Russian patent application No. 2020116533.

* cited by examiner

TREATMENT OF INSECTS

CROSS-REFERENCE TO RELATED APPLICATIONS

This application is a US National Phase of PCT/EP2018/078329 filed on Oct. 17, 2018, which claims priority to EP 17198475.0 filed on Oct. 26, 2017, both of which are expressly incorporated by reference herein for all purposes.

FIELD

The present invention relates to a method to treat insects in order to produce a human nutrition and/or an animal feed. The present invention further relates to a line to process insects.

BACKGROUND

Due to the increasing world population the demand for proteins is growing and insects can serve as an alternative protein source and/or as meat replacement for food for human consumption. Insects as a source of nutrition for human consumption comprise nutrients such as proteins, carbs, fat, vitamins, minerals and water. Examples of edible insects are bugs, mealworms, grasshoppers, bees, wasps, crickets and red ants. Insects as a source of nutrition is also applicable for animal feed Preferably the insects are cultivated in an insect farm and due to the possibility of vertical farming, less space is needed to achieve the same amount of weight of protein resulting in less impact on the environment. In comparison to beef two-thousand times less water and 12 times less feed is needed to grow the same amount of nutrition and one hundred times less gas emissions is realized.

SUMMARY

There is therefore a constant need to improve the treatment of insects in order to produce a human nutrition and/or an animal food. There is further a need to optimally exploit the nutritional contents of the insects. A further objective of the present invention is to provide an optically appealing and/or a well tasting product. Another objective of the present invention is to provide a line to process insects, particularly without loss of nutritional content and/or without damage to the optical appearance and/or the taste of the insects.

The problem is solved by a method to treat insects, wherein the autolysis of the insects is at least reduced, preferably stopped. Hence, no or little autolysis or self-digestion takes place, which results in change their color and their taste.

The present invention relates to a method to treat edible insects in order to produce a human nutrition and/or an animal food. An edible insect according to the present invention has preferably a chitinous exoskeleton, preferably a three-part body (head, thorax and abdomen) preferably at least three pairs of jointed legs, compound eyes and preferably one pair of antennae. Examples for edible insects are bugs, mealworms, grasshoppers, bees, wasps, crickets and red ants.

Inventively, these insects are treated such that autolysis of the insects is at least reduced, partially stopped. Hence, the protein content of the insects is not or not significantly reduced. The color of the insects remains, at least essentially unchanged.

Preferably, the temperature of the insects is reduced to or below $-10°$ C. within 0.5 seconds-45 minutes. preferably 1 Minute-30 Minutes and more preferably 1.5 Minutes-10 Minutes seconds. This rapid, if not instant, cooling will reduce, preferably stop the activity of enzymes which are responsible for the loss of nutrients, color (browning) and change of flavor. In order to stop/inactivate the enzyme activity the insects should be exposed to rapid cooling during. An additional advantage of quickly freezing the insects is that only a minimum dehydration will occur and ice crystals will stay small so any cell damage will be minimized.

According to a preferred embodiment of the inventive method, the insects are still alive prior to the cooling.

During cooling, the insects are preferably, cooled down to a core temperature of $-2-40°$ C., more preferably $-13-22°$ C., even more preferably $-15-23°$ C.

According to a preferred embodiment, the insects are subjected to a liquid and/or gaseous cooling medium.

The liquid medium is preferably liquid Nitrogen or liquid Carbondioxide or liquid air or a mixture thereof. Preferably the surface, particularly the entire surface is wetted with the liquid cooling medium. This can, for example be achieved by spraying the liquid cooling medium on the insects and/or submerging the insects into the liquid cooling medium. The liquid cooling medium evaporates on the surface of the insects and thereby reduce the temperature of the insects. The period of time that it takes to cool the insects down to a certain temperature and/or the final temperature of the insects can be influenced by the selection of the liquid cooling medium, the amount of liquid cooling medium provided per kilogram of insect-mass and/or by the contact-time between the cooling medium and the insects.

According to a preferred embodiment of the present invention, the wetting of the surface of the insects is, preferably constantly, renewed. This can be achieved by moving the insects and the liquid cooling agent relative to each other and/or by submerging the insects in the cooling agent and preferably stir the mixture. In case the liquid cooling medium is preferably sprayed on the entire surface of each insect and the wetting of the surface of the insect is renewed at least once.

Liquid cooling agent, which is not evaporated, can be collected, preferably filtered, if needed cooled and then reused.

In case a gaseous cooling medium is a gas, this gas preferably has a temperature between $-195$ and $-20°$ C. Preferably, the gas is air. The gas and the insects are preferably moved relative to each other. Preferably the gas is moved relative to insects. Preferably, a turbulent flow of the gas around the insects is established. Preferably, the gas is utilized to move the insects relative to a surface on which the insects are provided. This surface can be mesh or a grid or a gas permeable belt. The insects can be transported during cooling, for example relative to a nozzle system which ejects the cold gas. Preferably, the gas is collected after it has contacted the insects and recycled. If needed, the collected gas is cooled prior to reuse and/or cleaned prior to reuse.

According to a preferred embodiment, the insects are at least partially separated from each other prior and/or during cooling, so that the entire surface of the insects is cooled simultaneously and/or that there is no temperature rise of the insects due to enzymatic activities. The insects can for example be spread on a transportation means, for example a belt or submerged and stirred in a liquid, particularly a cooling liquid, like liquid $N_2$, liquid CO 2 liquid air or a mixture thereof.

According to a preferred embodiment a sensor is provided, which determines the temperature of the insect, particularly their core temperature, their surface temperature and/or a temperature averaged over the volume of the insect. Based on the signal of this sensor, the cooling process is controlled, particularly the contact-time of the insects with the cooling medium, the temperature- and/or the composition of the cooling medium and/or the heat-transfer conditions.

Preferably, the insects are agitated during cooling, wherein the mechanical impact on the insects should be at a minimum to avoid autolysis.

According to a preferred embodiment of the inventive method, the insects are killed during the cold treatment. Due to the cold treatment, the body-temperature of the insects is so reduced, that they are killed, but since the insects are already relatively cold, autolysis does not kick in or is significantly reduced, so that enzymatic browning is avoided or significantly reduced.

The inventive method can be carried continuous or batch-wise.

The inventive method is preferably carried out in a tumbler or a mixer. In the tumbler or the mixer, preferably a liquid cooling medium is used. The insects are provided to the tumbler/mixer and simultaneously before and/or after, the cooling medium is added to the tumbler/mixer. Since some of the cooling medium evaporated during cooling, the resulting gas can be collected, cooled and reused. Preferably, the pressure in the tumbler/mixer is adjustable. Preferably, the treatment of the insects takes place under a higher and/or a lower pressure relative to ambient pressure.

According to another preferred embodiment of the present invention, the insects are provided on transport means, which transport them through a freezer. The freezer preferably comprises a gaseous environment, which is preferably circulated. The transport means are preferably a belt, particularly a gas permeable belt. The freezer can alternatively or additionally comprises a bath with a cooling liquid, in which the insects are submerged. In this case, the transportation means is preferably a cage made from a mesh or grid, which keep the insects in the cage during cooling.

Preferably, an ingredient is added to the frozen insects. More preferably, the insects and the ingredient are mixed. Preferably, the insects, particularly the frozen insects are ground prior and/or after addition of the ingredient. The grinding can take place in a grinder, with a rotating knife and a hole plate and a single or double worm-screw, that transports the insects towards the rotating knife.

The problem is also solved with a line to process insects, which comprises a cooling apparatus, an ingredient supply and a grinder.

The disclosure made regarding the inventive method also applies to inventive line. Subject matters from the method can be incorporated into the line-embodiment and vice versa.

This embodiment of the present invention relates to a line that comprises a cooling apparatus, an ingredient supply and a treatment device such as a mixer, a tumbler, an Individual Quick Freezer (IQF), freezer, grinder etc.

The cooling apparatus may be a mixer with a liquid cooling medium, like liquid nitrogen. This embodiment has proven that the insects will be frozen gentle and quickly, within 0.5 seconds-45 minutes, and that autolysis is restrained. Further it turned out that the insects did not stick to each other so no lumps were formed which is of importance during the mixing with ingredients and it makes further processing easier. As soon as the cold treatment process is entirely finished the insects will be discharged from the mixer at a temperature depending on the insect species, in case of buffalo worms the temperature will be in the range of at least −10° C. The liquid cooling medium is provided together with the insects and/or before and/or after the insects have been supplied, preferably pumped or dropped into the mixer. During cooling the mixture of liquid cooling medium and insects is agitated, preferably mildly agitated, so that the insects are not damaged. In the mixer or after the mixer, means are preferably provided, which separate the frozen insects from the liquid cooling medium. The separated liquid cooling medium can be further used and/or recycled, preferably after a cooling and cleaning step, in which small insect particles are separated from the liquid cooling medium. The separation preferably takes place under a pressure, which is above ambient pressure.

In a second preferred embodiment of the invention, the insects are treated in a tumbler provided with a liquid cooling medium-, for example liquid nitrogen-connection. The tumbler is for example a GEA ScanMidi. Essentially reference can be made to the disclosure regarding the mixer. The gentle treatment of insects within the rotating tumbler in addition with the supply of liquid nitrogen to the insects will result in quickly freezing of the insects without enzymatic browning.

In a third preferred embodiment of the invention, the insects are treated in a cryogenic freezer comprising a freezer chamber. The insects will be placed on a transportation means, for example a belt. The insects come into direct contact with a liquid cooling medium, for example liquid nitrogen, and/or the insects will be sprayed with liquid a liquid cooling medium, for example liquid nitrogen, via spray nozzles provided within the freezer chamber.

After the freezing step, residues of the liquid cooling agent are preferably evaporated, for example by exposing the insects to an increased temperature and/or reduced pressure in comparison to the cooling chamber and/or during further processing such as grinding.

In a fourth preferred embodiment of the invention the insects are not subjected to a liquid cooling medium, but to cold gas, preferably cold air, preferably at a temperature of −195--20° C. The insects are quickly frozen in an individually quick frozen spiral freezer (IQF-spiral freezer) or an IQF tunnel freezer such as a fluidized bed freezer. The insects will be placed on the transport means preferably and a gas or liquid permeable conveyor such as a mesh conveyor wherein the mesh openings are small enough to support the insects. Beneath the transport means fans or the like will create a cold fluid flow preferably an air stream directed to the insects deposited on the running transport means. The velocity of the fluid flow will preferably be chosen such that the insects will be lifted above, preferably just above the surface of the transport means and tumble in the air resulting in an improved heat transfer between the insects and the air. This process results in quickly freezing of each and every insect without insects freezing together and creating lumps. In case of an open conveyor belt vibrating transport means can be used.

For all described embodiments the cooling medium liquid nitrogen can be substituted with another cryogenic medium such as carbon dioxide. This invention is not limited to a mixer provided with liquid nitrogen, a tumbler provided with liquid nitrogen, a cryogenic freezer or a fluidized bed freezer but to every apparatus and process able to quickly freeze insects in combination with limited mechanical action on the insects during the quickly freezing process.

According to a preferred embodiment, cold treatment is followed by a mixing step in a mixer wherein for instance ingredients and/or water are added. The temperature of the insects should be such that no activation of enzymes will occur even during this mixing step.

In a further step the insects will be ground. In order to prevent autolysis, the temperature of the insects should be so low that even due to the energy input during grinding no activation of enzymes will occur.

The temperature should be even so low that during all processing steps after the cold treatment in which the enzymes can be reactivated, the temperature will remain so low that no significant enzyme-activity takes place. Such additional processing steps can be mixing, grinding, forming and/or coating/battering Between pre-treatment and further processing of the insects the insects can be stored in a cold environment preferably such that no activation of enzymes will occur.

In a further processing process insects can be formed coated, fried and cooked but is not limited to these applications. In case of forming and/or coating the temperature of the mass of insects should be such that no enzyme activation will take place in order to prevent for instance a change of flavor after the final processing step.

BRIEF DESCRIPTION OF THE DRAWINGS

The inventions are now explained according to the Figures. These explanations do not limit the scope of protection and apply to all embodiments of the present invention likewise.

DETAILED DESCRIPTION

Figure 1:
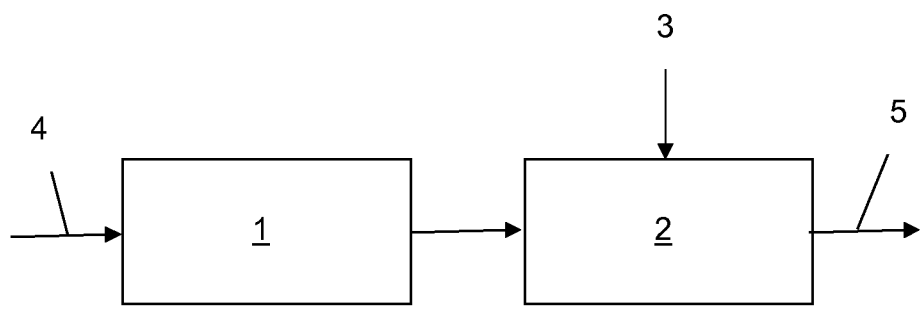
FIGS. 1-3 each depict an embodiment of the inventive method and the inventive line.

FIG. 1 shows a first embodiment of the present invention. The insects, dead or alive, are provided to a cooling step 1, which may be a batch or a continuous apparatus. In this apparatus 1 the core temperature of the insects is rapidly reduced to −2° C., preferably less, more preferably to less than −40° C. The cooling can take place by means of a liquid or gaseous cooling medium. A liquid cooling medium is for example liquid Nitrogen and/or liquid Carbon-Dioxide and/or liquid air or a mixture thereof. A gaseous cooling medium is for example air. After the cooling step 1, there may be a separation step in which the frozen insects are separated from the liquid cooling agents. The insects preferably exit the cooling step 1 with a temperature so low that during the entire downstream processing the temperature of the insects or the resulting product remains so low that no or little enzyme activity occurs, at least as long as the enzymes are still activatable. Preferably, the cooling step will take place in a mixer, wherein paddles are rotating, more preferably in a gentle way, such that each and every insect is treated in the same way. Subsequently, a grinding step 2 is provided. This grinding step may be carried out in a grinder, which comprise a rotating knife and a holed plate, which preferably divide each insect into multiple parts. If needed the grinder may be cooled. Additionally or alternatively, the temperature of the insects is so low after the cooling that even the energy input due the grinding does not raise the temperature of the insects or the ground insects above an undesired level, i.e. a temperature level at which enzymatic degradation kicks in.

In the present example, ingredients like spices, water or the like is added to the grinder and mixed with the insects. The ground and ingredients comprising insect-product 5 exits the grinder. Each process step in the line is either continuous or batch.

Figure 2:
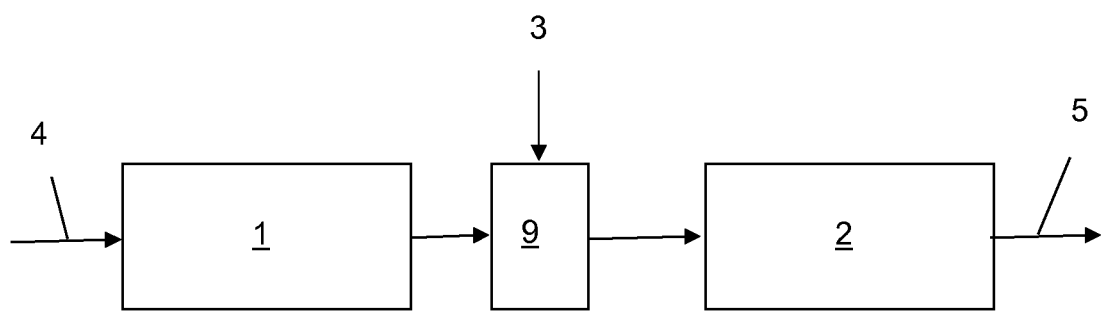

FIG. 2 shows another embodiment of the present invention. Reference can be made to the disclosure regarding FIG. 1. In the present case a mixer 9 is provided between the cooling step and the grinder and the ingredients are added to the mixer 9. The person skilled in the art understands that the temperature of the insects after the cooling is so low that also the energy provided to the insects in the mixer does not result in an undesired temperature rise.

Figure 3:
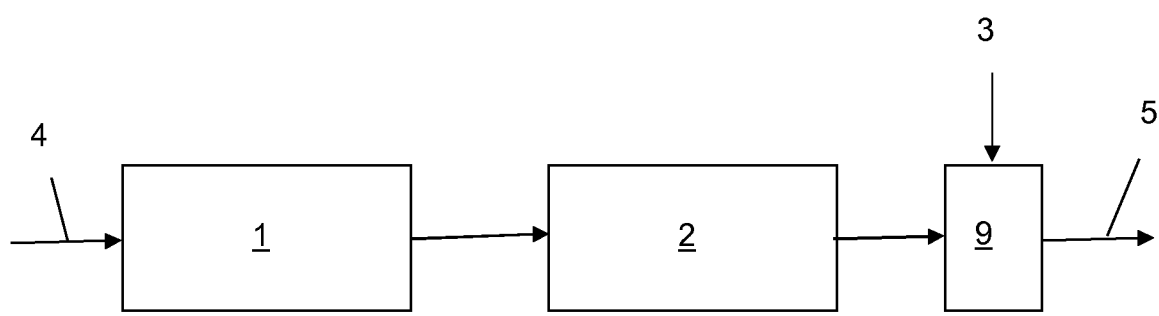

FIG. 3 shows yet another embodiment of the present invention. In the present the ground mixture is mixed with ingredients, for example spices and/or water or the like in a mixer 9, which is provided downstream from the grinder. Other than that reference is made to the disclosure regarding FIGS. 1 and 2.

Figure 4:
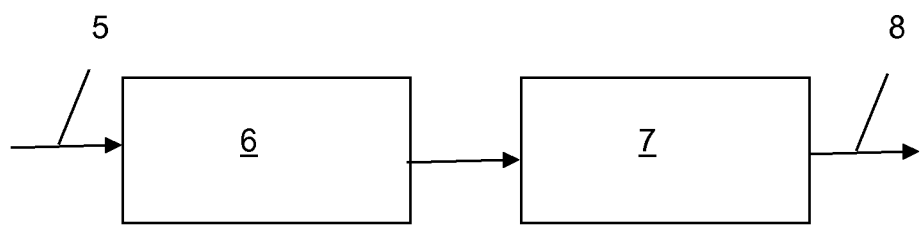
FIG. 4 depicts the posttreatment step.

FIG. 4 discloses a further processing step 7. Prior to further processing, the ground and ingredients comprising product may be stored at a temperature such that no enzymatic activity occurs, preferably at a temperature below −18° C. The further processing step may be battering, coating, frying, cooking and/or packaging.

REFERENCE-SIGNS

1 Cooling, cooling step
2 Grinding
3 Ingredient supply
4 untreated insects
5 pretreated insects
6 storage
7 post treatment step, further processing
8 treated insects
9 mixer

The invention claimed is:

1. Method to treat insects to produce human food and/or an animal feed, the insects comprising a chitinous exoskeleton, wherein the method comprises:
    reducing a core temperature of the insects to or below −10° C. in an apparatus using a cooling medium until an autolysis of the insects is reduced or stopped, wherein the reducing step takes place between 0.5 seconds and 45 minutes,
    wherein after the reducing step, the method includes further treatment steps including mixing, grinding, and forming, where during the further treatment steps: i) a protein content of the insects is not reduced and ii) a color of the insects remains unchanged,
    wherein the insects are frozen after the reducing step, the method includes a separation step in which the insects are separated from the cooling medium and wherein the separation occurs at a higher atmospheric pressure than ambient pressure, and
    wherein the apparatus comprises a sensor and the method further comprises: determining the core temperature of the insects with the sensor and then based on the determined core temperature of the insects, the method comprises: generating a signal to control i) a contact time of the insects with the cooling medium and ii) a temperature of the cooling medium.

2. Method according to claim 1, wherein the liquid and/or gaseous cooling medium comprises Nitrogen and/or Carbon-Dioxide.

3. Method according to claim 1, wherein the insects are agitated during the reducing step.

4. Method according to claim 1, wherein the insects are killed during the reducing step.

5. Method according to claim 1, wherein the method is carried out as a continuous or discontinuous process.

6. Method according to claim 1, wherein at least part of the method is carried out in a tumbler or a mixer.

7. Method according to claim 6, wherein the insects are at least partially wetted with the cooling medium.

8. Method according to claim 1, wherein the cooling medium has a temperature between −195° C. and −20° C.

9. Method according to claim 8, wherein the insects are provided on transport means, which transports the insects through a freezer of the apparatus, wherein the freezer comprises the cooling medium that is recirculated.

10. Method according to claim 1, wherein an ingredient is added to the insects, and the insects and the ingredient are mixed in the mixing step, and wherein the insects are ground prior to and/or after the ingredient is added to the insects.

11. Method according to claim 1, wherein the reducing step takes place in a mixer, the mixer includes rotating paddles.

12. Method according to claim 1, wherein the cooling medium is used to move the insects relative to a surface on which the insects are provided, wherein the surface is a mesh or grid.

13. Method according to claim 12, wherein the grinding step takes place in a grinder comprising a rotating knife and a holed plate, which cuts the insects into multiple parts.

14. Method according to claim 13, wherein ingredients, spices, and/or water are added to the grinder and mixed with the insects, and wherein the insects are alive before the reducing step.

15. Method according to claim 1, wherein the cooling medium is collected after the cooling medium has contacted the insects and recycled, the collected cooling medium is cooled prior to reuse.

16. Method according to claim 1, wherein the insects comprise a three-part body comprising a head, thorax, and abdomen; compound eyes; and one pair of antennae.

17. Method according to claim 1, wherein the method comprises storing the insects and storing ingredients at a temperature below 18° C. before a further processing step in the method, the further processing step comprising: battering, coating, frying, cooking, and/or packaging.

18. A method to treat insects to produce human food and/or an animal feed, the insects comprise a chitinous exoskeleton, the insects comprise a three-part body, comprising a head, thorax, and abdomen; compound eyes; and one pair of antennae, wherein the method comprises:
reducing a core temperature of the insects to or below −10° C. in an apparatus using a cooling medium having a temperature between −195 and −20° C., the reducing step takes place between 1.5 and 10 minutes, the cooling medium comprises air, the insects are alive before the reducing step, the method includes establishing a turbulent flow of the cooling medium around the insects;
grinding the insects in a grinder comprising a rotating knife and a holed plate, which cuts the insects into multiple parts;
adding ingredients, spices, and/or water to the grinder and mixed with the insects;
lifting and tumbling the insects with a flow of the cooling medium provided by one or more fans located below a surface on which the insects are provided, the surface is a mesh or grid,
collecting the cooling medium after the cooling medium has contacted the insects, recycling the collected cooling medium, and then cooling the recycled cooling medium prior to reusing the recycled cooling medium;
separating the insects from the cooling medium, wherein the separation occurs at a higher atmospheric pressure than ambient pressure;
wherein during the grinding step, a mixing step, and during further processing steps including forming and coating/battering the insects, i) a protein content of the insects is not reduced and ii) a color of the insects remains unchanged;
storing the insects and storing ingredients at a temperature below 18° C. before the further processing steps in the method; and
wherein the apparatus comprises a sensor for use in a determining step, wherein in the determining step, a core temperature of the insects is determined, and based on the determined core temperature, a signal is generated to control i) a contact time of the cooling medium with the insects, ii) a temperature of the cooling medium, iii) a composition of the cooling medium, and iv) heat transfer conditions.

* * * * *

UNITED STATES PATENT AND TRADEMARK OFFICE
CERTIFICATE OF CORRECTION

PATENT NO. : 11,889,844 B2
APPLICATION NO. : 16/640134
DATED : February 6, 2024
INVENTOR(S) : Martinus Johannes Wilhelmus Verhoeven It is certified that error appears in the above-identified patent and that said Letters Patent is hereby corrected as shown below:

In the Claims

Column 7, Line 44 delete "below 18°C." and insert -- below -18° C. --

Column 8, Line 36 delete "below 18°C." and insert -- below -18° C. --

Signed and Sealed this
Twenty-sixth Day of March, 2024

Katherine Kelly Vidal
*Director of the United States Patent and Trademark Office*